Patented Dec. 11, 1934

1,984,108

UNITED STATES PATENT OFFICE 1,984,108

CERAMIC MANUFACTURE

John I. Bahl, Canton, Ohio, assignor of one-half to Raymond W. Loichot, Canton, Ohio No Drawing. Application February 27, 1933, Serial No. 658,834

13 Claims. (Cl. 25—156)

The invention relates to vitreous porcelain or china products, to mixtures of ceramic materials or bodies used in making china products, and to methods of making china products from such bodies; and the present invention includes the methods for making the products, and the mixtures or bodies used in connection with the methods set forth in my prior application for United States Letters Patent for Ceramic manufacture, filed June 28, 1932, Serial No. 619,731, of which the present application is a continuation in part of common subject matter, and the present invention also includes improvements in said methods for making said products, and the mixtures or bodies used in connection with said methods.

China products, such as relatively thin walled dinner ware and relatively thick walled hotel ware, including flat and cupped ware, such as plates, saucers, cups, and the like, and hollow ware such as pitchers, sugar bowls, casseroles, jugs, and the like, are very desirable, not only from the standpoint of utility, by reason of the fact that china is substantially non-porous, and is relatively durable due to its relatively great strength in the finished state, but also from the standpoint of appearance, china possessing the physical characteristic of translucency in walls of the thinner thicknesses, and translucency is highly valued and is the characteristic by which china dinner ware is ordinarily identified.

Prior to the present invention, however, china products have been relatively difficult to make, and for many purposes have been prohibitive in cost.

On the other hand, semi-porcelain or non-vitreous earthenware products are relatively easy to make by the use of mass production methods, and with a consequent relatively low manufacturing cost per unit, but semi-porcelain has the undesirable characteristics of being very absorbent or porous, and of being relatively short lived in use because of its relatively low strength. Moreover, semi-porcelain is opaque even in the thinnest wall thicknesses, and is thus easily identified, and semi-porcelain dinner ware, hotel ware, and similar products are substantially universally considered to be inferior to china dinner ware, hotel ware, and similar products, and accordingly semi-porcelain dinner ware and hotel ware has been used heretofore primarily because of its low initial cost as compared with the initial cost of china dinner ware and hotel ware as heretofore made.

Moreover, semi-porcelain dinner ware and hotel ware has been considered to be undesirable for use, particularly by a large number of different persons, because the absorbent characteristics of semi-porcelain ware results in an absorption of germs, bacteria, and the like by the ware.

Chinas include those known as Belleek china, and usual hotel china, which are made in the United States, and foreign chinas which are made in European countries, and all of such chinas are made by very old methods or processes, which are relatively slow, and relatively expensive.

On the other hand semi-porcelain manufacture is carried on particularly in the United States by mass production methods or processes, and with a consequent relatively low cost per unit of the ware or product.

Fundamental reasons for the differences between semi-porcelain manufacturing processes and china manufacturing processes, arise from the fact that semi-porcelain bodies are strong enough to permit jigger forming flat and cupped ware from bats made from rolls and rapid forming of hollow ware by slip molding, and from the fact that the green formed semi-porcelain ware is strong enough to permit mass production placing in the bisque and gloss operations.

On the other hand china bodies as heretofore known, require what amounts to slow individual forming, processing, handling, and placing of each separate piece.

In order to facilitate the exposition of the present invention, usual manufacturing processes used in making semi-porcelain dinner ware, and in making Belleek, hotel, and foreign china dinner ware are described and compared as follows:

SEMI-PORCELAIN PROCESS

*Preparing slip in the semi-porcelain process*

A liquid mixture containing proper proportions of the ground raw materials and water is introduced into a blunger which consists of a vertical drum which may be substantially 7 feet high and 6 feet in diameter, and in which vertical arms laterally offset on opposite sides of a vertical axis are operatively mounted for revolving about the vertical central axis, and the vertical arms preferably rotate about their own axes, and each vertical arm preferably has horizontal arms extending therefrom.

The liquid mixture in the blunger is blunged or agitated for approximately 1 to 2 hours, and is next introduced into a rough agitator.

The rough agitator may be also a vertical drum 10 to 12 feet in height and substantially 8 feet in diameter, and in which revolving paddles are operatively mounted for agitating the liquid mixture introduced therein, which is now in slip form.

From the rough agitator, the slip is passed through a lawn or screen machine which usually includes two lawns or screens, the first of which is approximately 100 mesh and the second of which is approximately 150 mesh.

The slip passes through these screens, and is cleared of foreign matter, dirt, cinders, and the like.

After passing through the screen or lawn machine, the slip is passed over a magnetic separator so as to clear the slip of metallic particles such as iron, after which the slip is introduced into a smooth agitator of the same general construction and operation as the rough agitator.

Only clean slip however is introduced into the smooth agitator. Hollow ware is formed from slip.

*Preparing rolls in the semi-porcelain process*

From the smooth agitator, for preparing round rolls of clay, the slip is pumped by air into an air compressor which forms leaves or cakes of clay. The pressure in the compressor varies between 85 pounds per square inch to 150 pounds per square inch, and the time required for pressing the leaves of clay is usually from 1½ to 2 hours.

The clay leaves are then removed from the compressor and stored in an ageing room, after which they are mauled and then introduced into a pug mill which extrudes a round column of clay approximately 6 inches in diameter and is severed into rolls approximately 2½ feet long.

Flat ware is formed from the rolls.

*Forming flat and cupped ware in the semi-porcelain process*

Relatively thin bats or disks of clay are severed from the rolls, and each bat is formed in a jigger into a plate, saucer, or the like.

A jigger includes a rotating horizontal wheel upon which a mold is placed and on which mold a bat of clay is introduced. The mold conforms to the front of the plate. The jigger also includes a pull down arm having a tool inserted therein which forms the back of the plate or flat piece as the same is rotated thereunder on the mold.

The jigger method of forming enables the forming of the maximum number of green pieces per worker per day.

Flat and cupped ware formed by jiggering include all size dinner plates, fruit dishes, saucers, oatmeal dishes, and other special dishes, and also all size cups, bowls, salad plates, and nappies. In jigger forming cups and the like the tool forms the inside of the cup.

After jigger forming, the ware is dried from 2 to 24 hours, after which the dried ware is sent to a finisher.

The edges of jiggered ware are finished by means of a fettling tool, and surfaces of the jiggered ware are further finish formed by means of a moistened sponge, and such finishing operations are very rapid.

Jigger forming of ware in the semi-porcelain process is carried out at the rate of from 250 to 550 dozen pieces per day per jiggerman.

*Forming hollow ware in the semi-porcelain process*

Hollow ware is formed by pouring slip from the smooth agitator into a plaster of Paris mold having the external conformation of the desired piece.

The plaster of Paris of the mold absorbs water from the slip, and a layer or shell of clay body is built up in the mold against the mold surface, after which the surplus slip is poured out, and the mold is separated from the formed piece dried from 1½ to 24 hours, and the formed and dried piece is finished with a wet sponge.

Hollow ware formed in this manner includes cream pitchers, sugar bowls, casseroles, jugs, and the like.

*Bisque kiln operations in the semi-porcelain process*

After the ware has been formed as aforesaid in the semi-porcelain process, the flat ware is piled into bungs one directly on top of another and the bungs are from 6 to 14 pieces high, and each bung is placed in a sagger without any silica sand, flint, or any other material or separating elements introduced between the pieces.

The hollow ware is also placed in saggers without the use of any positioning materials or elements.

Bowls and cups are placed in saggers with their open faces abutting each other, and this placing is known as boxing.

The saggers containing the semi-porcelain ware thus placed are then positioned in either a periodic kiln or tunnel kiln. This method of placing the ware is very rapid, and also economical in space, and a bisque kiln 16'—6" in diameter and 16'—6" high will hold through this placing method from 4000 to 4500 dozen pieces.

The ware thus placed in the bisque kiln is fired at a temperature of preferably cone 8-9 down. The time of firing is usually 50 to 55 hours per kiln.

When a tunnel kiln is used, the ware is placed in the same manner but the time for passing the ware through the tunnel kiln for the bisque step is usually 72 to 80 hours.

After firing, the ware is drawn from the bisque kiln and is placed in a bisque warehouse, where the ware is brushed clean ready for dipping.

The ware is dipped in a tub, placed in a revolving mangle, and subject to a heat treatment, and then is positioned on boards ready for the gloss kiln operations.

*Gloss kiln operations in the semi-porcelain process*

After the semi-porcelain ware has been dipped in the gloss as aforesaid, the flat ware is placed in saggers in the gloss kiln by the use of either one of two arrangements.

In the first arrangement, a saddle is placed at the bottom of the sagger, and the flat ware is placed on edge on the saddle and each piece is supported in the back by pins extending from opposite sides of the sagger. By this arrangement kiln dirt is prevented from gathering on the face of the ware.

In the other arrangement, three supporting pins are placed on the bottom of the sagger, and one piece of flat ware is supported on the first set of pins and the ware is then piled one above the other with a set of supporting pins between each two pieces.

Hollow ware is placed in saggers in the gloss kiln, each piece on its feet.

This method of placing semi-porcelain ware in the gloss kiln, enables a periodic kiln 16'—6" in diameter and 16'—6" in height to hold from 2500 to 2800 dozen pieces.

The approximate firing time in the gloss kiln is from 35 to 42 hours and the firing temperature is approximately cone 2-5 down.

USUAL BELLEEK CHINA PROCESS

*Preparing slip in Belleek china process*

A liquid mixture containing proper proportions of the ground raw materials and water is introduced into a rotating ball mill. The balls of the ball mill subject the material to a rolling for a substantial period so as to thoroughly dissolve the ground raw materials in the water.

From the ball mill the liquid solution is passed through a lawn or screen of approximately 150 to 200 mesh, and from the lawn or screen the slip solution is passed over a magnetic separator, and then introduced into a smooth agitator.

After being agitated in the smooth agitator the slip is ready for use in forming ware.

*Forming flat and cupped ware in the Belleek china process*

A jigger is used, and a mold is placed on the rotating wheel of the jigger, and slip is poured onto the mold and permitted to dry for a short period.

The jiggerman then uses the pull down arm with an inserted tool to roughly form the contour of the back of the piece. The mold is then removed with the partially formed piece for a further period for further drying, after which it is replaced upon the jigger and a hand tool is used for completing the contour.

The reason for forming flat and cupped ware as aforesaid, in the Belleek china process, is because ordinary china clay bodies have not sufficient strength to permit making a bat of clay, and forming the ware from bats as heretofore described for the semi-porcelain process.

In the Belleek china process, after the flat ware is jiggered, it is very brittle, and very fragile.

Each piece of the green formed ware must be finished with a substantially dry piece of flannel, and the finishing operation is relatively slow.

In the Belleek china process, the usual jiggerman can only form 25 to 35 dozen pieces per day.

In the Belleek china process, hollow ware is cast from slip in molds, as heretofore described for casting hollow ware in the semi-porcelain process, but the casting of hollow ware in the Belleek china process, is very slow because of the porosity of the body, and accordingly the forming operation of hollow ware in the Belleek process is at a considerably reduced rate as compared with that in the semi-porcelain process.

*Bisque kiln operations in the Belleek china process*

Each piece of flat or cupped ware is placed in an individual sagger, known as a bedder. The bedder contains a small body of flint which has the same upper external conformation as the front of the flat or cupped ware supported thereon.

The bedders are placed in the bisque kiln one upon the top of each other, and the placing of the same is a very slow operation.

Each piece of hollow ware is placed in the bisque kiln in a sagger, and each sagger is filled with silica sand up to what is known as the belly of the piece, and consequently the placing of hollow ware in the bisque kiln in the Belleek china process is also very slow.

In a periodic kiln 16'—6" in diameter and 16'—6" in height, only 800 to 1200 dozen pieces of Belleek china may be placed for the bisque firing.

The bisque firing is carried out at a temperature of cone 3-5 down, and the period of firing is approximately 20 to 25 hours.

The bisque Belleek china ware is then drawn from the bisque kiln and taken to the bisque warehouse, where each piece is either sand blown or hand sanded, so as to remove all flint and roughness from the bisque body. At this point, the ware is carefully inspected for defects, and for translucency which is very irregular.

The ware is then ready for dipping. Belleek china ware must be dipped in a very heavy glaze and the operation is very slow on account of what is known as hand balancing of the glaze, due to its thickness.

*Gloss kiln operations in the Belleek china process*

After the glaze has dried on the ware, the feet of each piece must be cleaned, because each piece must be placed in the gloss kiln in an individual sagger on its feet face up for the gloss kiln firing. If the feet are not cleaned, the piece will stick to the sagger, and very large hunks of ware will be pulled out of the feet.

The gloss kiln placing of Belleek china ware is very slow, and the quantity which may be placed in a periodic kiln 16'—6" in diameter and 16'—6" in height is approximately 800 to 1200 dozen.

Belleek china ware is fired in the gloss kiln at a temperature of cone .01—1 down, for a period of from 18 to 20 hours.

*Usual foreign china processes*

In the manufacture of foreign chinas in Europe, the clay is prepared in the slip and roll form by the use of methods similar to those heretofore described for the semi-porcelain process.

The jigger forming of foreign china ware, however, requires the use of a hand tool which slows down the production of each jiggerman substantially ⅓ less than that of the production of a jiggerman in the semi-porcelain process.

After the jigger forming step, all foreign china is processed substantially by the use of the steps above described for the Belleek china process, which is relatively slower and costly as aforesaid, by reason of the sanding, dipping, and gloss placing operations required.

*Usual hotel china process*

The slip and rolls, and the green forming of ware in the making of hotel china is carried out in the same manner as that described in the semi-porcelain process, but the speeds of these operations are relatively slow largely on account of the excessive weight of each piece of formed green hotel china ware required in order that the body of the piece shall have the necessary strength in the green state.

The bisque kiln placing of hotel china ware is similar to that used in the semi-porcelain process, but in the hotel china process, each bung of ware in its sagger is placed in a vibrating machine, and the spaces between the separate pieces are filled with silica sand, and the bung is then placed upon a bedder, which conforms with the bottom piece, and the bedder with the bung is then placed in a sagger, and this placing and handling of hotel china ware in the bisque kiln is substantially ½ slower than the placing of ware in the bisque kiln in the semi-porcelain process.

Bisque kiln firing of hotel china ware is at the relatively high temperature of cone 10–12 down, and the period of firing is from 60 to 70 hours per kiln.

The hotel china ware is next drawn to the bisque warehouse, and from this stage on, it must be sanded and cleaned the same as Belleek china ware, dipped the same as Belleek china ware, and gloss fired the same as Belleek china ware.

*Processes compared*

The greatly reduced labor required in man hours per piece in the semi-porcelain process is clearly indicated from the following summarized comparisons of production statistics relating to jigger forming, and kiln placing, in each of the above processes; it being noted that the total time required for placing ware in a kiln is about the same in all the processes.

PROCESSES COMPARED

*Jigger forming*

|  | Dozen per day per man |
|---|---|
| Semi-porcelain process | 250 to 550 |
| Hotel china process | 170 to 370 |
| Foreign china process | 25 to 100 |
| Belleek china process | 25 to 35 |

*Bisque kiln placing*

|  | Dozen per kiln |
|---|---|
| Semi-porcelain process | 4000 to 4500 |
| Hotel china process | 2000 to 2250 |
| Foreign china process | 2000 to 2200 |
| Belleek china process | 800 to 1200 |

*Gloss kiln placing*

|  | Dozen per kiln |
|---|---|
| Semi-porcelain process | 2500 to 2800 |
| Hotel china process | 1250 to 1400 |
| Foreign china process | 800 to 1200 |
| Belleek china process | 800 to 1200 |

In general, ceramic products including both vitreous porcelain or china, as well as semi-porcelain products, are made from bodies including various mixtures of clays, spars, and flints.

The physical characteristics of a particular body, and also of the products made therefrom, are not determined only by the chemical characteristics of the materials used to make the body, but more predominately by the physical characteristics of the materials.

Many usual china bodies, as aforesaid, have such physical characteristics, and in particular are so weak as to transverse strength in the green state, that bats cannot be formed therefrom.

All usual china bodies in the dried state after forming have been so weak as to prohibit bisque placing without the use of supporting materials or elements between the pieces of the ware.

The objects of the present invention include the following:

First, to provide methods for making a ceramic body or composition of matter which has improved physical characteristics, including particularly a greatly increased transverse strength in the green state, and in the dried state after forming, and from which vitreous porcelain or china products including both dinner ware and hotel ware may be made.

Second, to provide methods for making improved vitreous porcelain or china products including both dinner ware and hotel ware made from such an improved body, and which are themselves improved more particularly as to their strength by reason of reduced brittleness; and Third, to provide mass production methods whereby vitreous porcelain or china products including both dinner ware and hotel ware may be made with greatly reduced labor and other costs per piece.

The foregoing and other objects are attained by the methods, processes, steps, improvements, combinations, sub-combinations, which comprise the present invention, and the nature of which is set forth in the following general statement, and preferred details of which are set forth in the following description, and which are more particularly and distinctly pointed out and set forth in the appended claims forming part hereof.

In general terms the improved ceramic body preferably used in connection with the improved methods of the present invention includes a mixture containing clays, spars, flint, whiting, and including a total clay content of 40—50%, which total clay content includes upwards of 23% or more of a ball clay which may be and preferably is the Canadian ball clay known as H. P. I. ball clay, or any ball clay having similar physical characteristics.

H. P. I. ball clay is a Canadian clay of the general type known technically in the ceramic industry as a binding clay due to its plasticity, and "H. P. I." or "H. P. 1", as it may be written, is the trade name used to designate the clay by Midland Clay Company, the owner of the mine where it is found.

H. P. 1 ball clay is mined by Midland Clay Company at its mine located three miles from the town of Willow Bunch, Saskatchewan, Canada, or in other words between longitude 105 and 107 west from Greenwich, and between latitude 49 and 50 north.

The depth of the clay is irregular on account of the lay of the land, the H. P. 1 clay being the first strata under the top line of coal.

In general terms the improved burned vitreous porcelain or china products made by the use of the improved methods of the present invention include burned products including both dinner ware and hotel ware made preferably from the improved body.

In general terms the improved methods of the present invention include making the improved vitreous-porcelain or china bodies and products by carrying out process steps which are substantially the same as the steps of the semi-porcelain process, or modifications thereof.

More specifically, one series, Series "A", of the improved ceramic bodies preferably used in carrying out the improved methods of the present invention is set forth in the following table showing substantially the percentage ranges of the several ingredients or materials used to make the improved bodies of Series "A".

*Composition of improved bodies in percentage ranges, series "A"*

| | Percent |
|---|---|
| H. P. 1 ball clay, Canada | 6–23 |
| Imperial spar, U. S. | 15–20 |
| Florida clay, if any, U. S. | 8 |
| Georgia clay, if any, U. S. | 7 |
| China clay, English | 17–32 |
| Whiting, U. S. | 1–6 |
| Flint, U. S. | 38–40 |

Percentage formulas of the specific bodies of Series "A", made up according to the present invention are set forth in the following table:

*Specific improved bodies, series "A" percentage formulas*

| Improved body no. | 1 | 2 | 3 | 4 | 5 | 6 | 7 | 8 |
|---|---|---|---|---|---|---|---|---|
| Material: | Per cent | Per cent | Per cent | Per cent | Per cent | Per cent | Per cent | Per cent |
| Imperial spar | 15.0 | 15.0 | 15.0 | 15.0 | 15.0 | 15.0 | 15.0 | 15.0 |
| H. P. 1 ball clay | 6.0 | 20.0 | 20.0 | 23.0 | 23.0 | 23.0 | 20.0 | 19.5 |
| Florida clay | 8.0 | 8.0 | 0.0 | 0.0 | 0.0 | 0.0 | 0.0 | 0.0 |
| Georgia clay | 0.0 | 0.0 | 7.0 | 0.0 | 0.0 | 0.0 | 7.0 | 7.0 |
| English china clay | 32.0 | 18.0 | 18.0 | 20.0 | 19.0 | 18.0 | 17.0 | 17.0 |
| Whiting | 1.0 | 1.0 | 2.0 | 4.0 | 5.0 | 6.0 | 3.0 | 3.0 |
| Flint | 38.0 | 38.0 | 38.0 | 38.0 | 38.0 | 38.0 | 38.0 | 38.0 |
| Rutile | 0.0 | 0.0 | 0.0 | 0.0 | 0.0 | 0.0 | 0.0 | 0.5 |

Other specific bodies for use in connection with the present improvements, have been made to include as high as 42% of the H. P. 1 Canadian ball-clay, but it has been discovered that the foregoing 8 specific improved bodies, are preferable for making improved china dinner ware by the improved method hereof, wherein very rapid drying is not required between the jigger forming and finishing of the ware prior to the bisque placing of the ware.

Another series, Series "B", of the improved ceramic bodies preferably used in carrying out the improved methods of the present invention is set forth in the following table showing substantially the percentage ranges of the several ingredients or materials used to make the improved bodies of Series "B".

*Composition of improved bodies in percentage ranges, series "B"*

| | Percent |
|---|---|
| Binding clay, H. P. 1 ball clay, Canada or clay having similar characteristics | 20–25 |
| Blending clays, U. S. and English, preferably including a highly moisture absorptive clay | 20–25 |
| Imperial spar, U. S. | 15–20 |
| Whiting | 1–6 |
| Flint | 30–40 |

A preferred composition of one of the improved bodies of Series "B" adapted for making either or both dinner ware or hotel ware by process steps including very rapid drying between the jigger forming and finishing steps, is as follows:

*Preferred composition of improved body percentage formula*

| | Percent |
|---|---|
| H. P. 1 ball clay, Canada | 22 |
| Georgia clay, U. S. | 5 |
| North Carolina clay, U. S. | 5 |
| Kentucky Bell clay, U. S. | 5 |
| China clay, English | 8 |
| Imperial spar, U. S. | 15 |
| Whiting, U. S. | 4 |
| Flint, U. S. | 36 |

The following are typical analyses of the different materials in the improved bodies.

*H. P. 1. Ball Clay, Canadian*

| | | Per cent |
|---|---|---|
| Silica | $SiO_2$ | 57.62 |
| Alumina | $Al_2O_3$ | 28.55 |
| Iron oxide | $Fe_2O_3$ | .58 |
| Titanium | $TiO_2$ | .91 |
| Calcium | $CaO$ | .23 |
| Magnesia | $MgO$ | .63 |
| Alkali | | None |
| Loss on ignition | | 11.47 |
| Water for plasticity | | 29.8 |
| Drying shrinkage | | 9.2 |
| Modulus of rupture raw 816 lb. per sq. inch. | | |
| Fusion point: cone 32 | | |
| Color fused: white | | |

*Florida, Georgia or North Carolina Kaolin clay, U. S.*

| | | Per cent |
|---|---|---|
| Silica | $SiO_2$ | 45.74 |
| Alumina | $Al_2O_3$ | 38.47 |
| Iron Oxide | $Fe_2O_3$ | 0.53 |
| Titanium Oxide | $TiO_2$ | 1.07 |
| Calcium Oxide | $CaO$ | .05 |
| Magnesium Oxide | $MgO$ | .13 |
| Sodium Oxide | $Na_2O$ | .04 |
| Potassium Oxide | $K_2O$ | .20 |
| Loss on ignition | | 13.69 |
| Linear drying shrinkage | | 5.2 |
| Fusion point cone 34 | | |

*Kentucky bell ball clay*

| | | Per cent |
|---|---|---|
| Silica | $SiO_2$ | 68.54 |
| Alumina | $Al_2O_3$ | 19.92 |
| Ferric oxide | $Fe_2O_3$ | .80 |
| Ferrous oxide | $FeO$ | tr. |
| Lime | $CaO$ | tr. |
| Magnesia | $MgO$ | .70 |
| Titanic oxide | $TiO_2$ | 1.20 |
| Potash | $K_2O$ | 1.66 |
| Soda | $Na_2O$ | .24 |
| Water (chemical) | | 6.25 |
| Moisture | | 1.10 |

*China clay, English*

| | | Per cent |
|---|---|---|
| Silica | $SiO_2$ | 47.10 |
| Titanium | $TiO_2$ | .00 |
| Alumina | $Al_2O_3$ | 39.42 |
| Iron oxide | $Fe_2O_3$ | .32 |
| Calcium | $CaO$ | .31 |
| Magnesia | $MgO$ | .24 |
| Potash | $K_2O$ | .16 |
| Soda | $Na_2O$ | .08 |
| Loss on ignition | | 12.24 |

*Imperial spar, U. S.*

| | | Per cent |
|---|---|---|
| Silica | $SiO_2$ | 67.12 |
| Alumina | $Al_2O_3$ | 18.62 |
| Iron oxide | $Fe_2O_3$ | .040 |
| Calcium | $CaO$ | .17 |
| Magnesia | $MgO$ | .00 Trace |
| Soda | $Na_2O$ | 2.57 |
| Potash | $K_2O$ | 11.34 |
| Loss of ignition | | .14 |

*Whiting, U. S.*

| | | Per cent |
|---|---|---|
| Silica | $SiO_2$ | 1.13 |
| Iron | $Fe_2O_3$ | .24 |
| Alumina | $Al_2O_3$ | |
| Calcium | $CaCO_3$ | 98.50 |

*Flint, U. S.*

| | | Per cent |
|---|---|---|
| Silica | $SiO_2$ | 98.05 |
| Alumina | $Al_2O_3$ | .05 |
| Iron oxide | $Fe_2O_3$ | .35 |
| Calcia & magnesia | $CaO$ & $MgO$ | 1.55 |

The foregoing materials in the proportions set forth as aforesaid are preferably used to make the improved china bodies and products by the improved methods hereof.

Certain unusual physical characteristics of the improved bodies are as follows:

*Physical characteristics*

| | |
|---|---|
| Per cent H₂O, before drying | 20.55 |
| Per cent volume shrinkage, drying | 16.00 |
| Per cent volume shrinkage, firing, at cone 9–10½ | 21.05 |
| Per cent volume shrinkage, total | 37.30 |
| Per cent H₂O absorption, after firing | 1.6 |

*Transverse strength*

The transverse strength of the present improved china bodies in the green state is from 250 to 450 pounds per square inch; whereas usual china bodies in the green state prior to the present improvements have had a transverse strength of from 90 to 150 pounds per square inch.

In the dried and formed state, ready for placing in the bisque kiln, the improved china bodies have a transverse strength of 600 pounds per square inch and greater; whereas usual china bodies after forming and drying have a strength of from 150 to 250 pounds per square inch.

Each of the foregoing specific improved bodies, after firing, produces a vitreous porcelain or china product.

In view of the fact that no vitreous porcelain or china body heretofore has ever been known in the art to employ the H. P. 1. Canadian ball clay, the fact that vitreous porcelain or china may be made from bodies containing a ball clay such as the H. P. 1. Canadian ball clay, is in itself a distinct improvement in the art.

The improved bodies and vitreous porcelain or china products made therefrom are set forth and claimed in my divisional application hereof, for Ceramic manufacture, filed June 8, 1933, Serial No. 674,960.

It has furthermore been discovered by the present invention, that vitreous porcelain or china products may be made when desired by subjecting the improved bodies to the steps of the semi-porcelain or earthenware manufacturing process as aforesaid, without changing any of said steps.

Accordingly the improved method of the present invention includes the steps of making slip, rolls, and bats of one of the improved bodies hereof, jigger forming flat and cupped ware from the bats, and/or slip molding hollow ware from the slip, and then placing and bisque kiln firing the dried formed ware, and then drawing, dipping, and gloss kiln firing the bisque ware, all of said steps being carried out according to the semi-porcelain or earthenware manufacturing process, but with the novel result of producing vitreous porcelain or china products.

From another standpoint, each of the improved ceramic bodies includes a mixture of ceramic materials which burn to make vitreous porcelain, and which in the green state have a transverse strength of over 150 pounds per square inch, and preferably from 250 to 350 pounds per square inch, and which in the dried state have a transverse strength of over 250 pounds per square inch, and preferably 600 pounds per square inch and greater, and which preferably include Canadian H. P. 1 ball clay, or a clay having similar characteristics.

Similarly, from the same standpoint, the improved method of the present invention includes making a ceramic body preferably including Canadian H. P. 1 ball clay, or a clay having similar characteristics, and the body in the green state having a transverse strength of over 150 pounds per square inch, and preferably of from 250 to 350 pounds per square inch, and in the dried state having a transverse strength of over 250 pounds per square inch, and preferably 600 pounds per square inch and greater, and making vitreous porcelain or china products from the body by subjecting the same to the steps of the semi-porcelain or earthenware manufacturing process.

It has furthermore been discovered that the improved ceramic bodies are adaptable for receiving a raw glaze and for making glazed products by the one firing method.

It is furthermore a distinguishing characteristic of the improved bodies, that the same are mixed in the raw state without fritting.

Decoration of the ware made from the improved bodies by the improved methods, may be effected in the usual manner, after making the gloss ware, or under certain conditions, undergloss decorations may be employed, by reason of the unusual strength of the improved bodies in the green state.

The natural color of the improved bodies after being fired in the bisque kiln is pure white.

*Processing improved bodies*

The improved bodies as above set forth may be processed to make china products by subjecting the same to the usual steps of the semi-porcelain process as hereinbefore set forth.

For attaining the best results, it is preferred however to use the improved process hereinafter set forth, which may be considered from one standpoint as including modifications of the steps of the usual semi-porcelain process, the modified steps constituting a mass production china process by which dinner ware and hotel ware may be made from the improved bodies, simultaneously if desired.

PREFERRED IMPROVED CHINA PROCESS

*Preparing slip in present improved china process*

The raw solid materials are used to make slip as received in the commercial form, all the clays being unground and as received directly from the mine, and the spar, flint, and whiting each being ground material at a fineness of 140 mesh.

Quantities of the several materials in the proportions set forth as aforesaid are placed into a blunger together with water. The best results are attained when the proportions of the materials are those set forth in the preferred composition of body in Series "B", as aforesaid.

The solid materials and water in the blunger are mixed or blunged by the revolving arms of the blunger for a period of ½ to 4 hours until the mixture becomes a liquid slip.

In the blunging operation the water dissolves the solid materials to form a liquid slip weighing from 20 to 24 ounces to the pint and having a small lumpy consistency.

The slip from the blunger is then placed in a rough agitator, where it is agitated until it becomes a smooth liquid slip.

From the rough agitator the smooth liquid slip is passed through a screen of preferably 130 mesh and not more than 150 mesh and the screening of the smooth liquid slip serves to remove all dust and all undissolved lumps of clay from the slip.

It is preferred that the smooth liquid slip from the rough agitator be passed through a double screen, the first screen being 120 mesh and the second screen being 130 mesh.

After screening the slip weighs from 20 to 26 ounces per pint, and has a smooth creamy consistency.

The smooth creamy slip is then passed over a magnetic separator which removes from the slip all magnetic metallic particles.

The clean creamy slip is then flowed into a revolving smooth agitator for storage to keep the clay from settling from the slip.

Hollow ware is formed directly from the slip as set forth hereinafter.

Preparing rolls in the preferred improved china process

From the smooth agitator, for preparing round rolls of clay the clean creamy slip is pumped by air at a pressure of from 65 to 200 pounds per square inch into clay presses where clay cakes are formed, and which are known in the pottery industry as clay leaves and each of which is about 1½ inches thick and about 30 inches in diameter and contains about 30% of moisture, and the time required for pressing the leaves is from 1 to 3 hours.

The clay leaves are then stacked and mauled for solidifying and are stored in stacks in bins for use when needed, the stacks being preferably covered by a wet canvas to retain the moisture in the clay leaves.

The clay leaves are then run through a pug mill and the clay is pugged by the addition of the necessary water or slip to normalize unusual drying which may have occurred.

The clay is pugged into a homogeneous mass and is discharged through an annular die of the pug mill in the form of a solid cylindric column from 4 to 6 inches in diameter and which is severed into rolls of from 30 to 36 inches in length. Flat and cupped ware is formed from the rolls.

Jigger forming flat and cupped ware in the preferred improved china process

Relatively thin bats or disks of clay are formed from the rolls and each bat is formed in a jigger into a plate, saucer, or the like.

For this purpose, a workman known as a batter-out takes a hung of clay from a roll by his hand and places the hunk upon a flat plaster of Paris stationary block.

The batter-out takes a bat or maul having a head with a flat face and mauls the hunk into a flat piece of clay which is known as a bat, and which is from ¼ to ½ inch thick and of sufficient diameter to form the desired size of jiggered ware.

The bat is placed on a mold conforming to the front or outside of the ware, and the mold with the bat thereon is placed on a jigger wheel of a jigger which is rotating at the rate of from 200 to 1200 R. P. M.

In addition to the jigger wheel, which is horizontal and which rotates about a vertical axis, the jigger also includes a pull down arm having a tool inserted therein which forms the back or inside of the piece of ware as the same is rotated under the tool on the mold.

Flat and cupped ware formed by jiggering include all size dinner plates, fruit dishes, saucers, oatmeal dishes, and other special dishes, and also all size cups, bowls, salad plates, and nappies.

Jigger forming of ware in the improved china process is carried out at the rate of from 180 to 500 dozen pieces per day per jiggerman.

Drying flat and cupped ware in the preferred improved china process

Each mold with a piece of jigger formed ware thereon is placed upon a shelf on a continuous conveyor and is carried by the conveyor in a tortuous path through a drying chamber heated by steam pipes and in which the atmosphere or air is agitated by means of fans and the like.

The jigger formed ware remains in the drier for substantially 2 hours until its moisture content is from 5 to 10%.

Finish forming flat and cupped ware in the preferred improved china process

After drying, the jigger formed flat and cupped ware is ready for the finisher, who removes the ware from the molds, and stacks up 6 to 12 similar pieces to form a bung, and each bung is placed upon a revolving hand whirler upon which the pieces are rotated about an axis passing vertically through their centers, and the sharp edges of the rims of the pieces are trimmed off with a finishing tool, and then smoothed by a water moistened sponge.

The bungs of the finished jigger formed ware are then placed on shelves which are placed on racks known as stilliards in a room or chamber opening to the normal atmosphere and having steam heating pipes in its floor.

The bungs of the finished jigger formed ware are dried on the stilliards in the normal atmosphere until the moisture content of the ware has been reduced to substantially 2%.

In forming the improved flat ware, particularly in the case of plates, the contour of the plate from the center of the foot of the plate to the outside edge of its rim must be related to the temperature used in burning for example, a 7 inch diameter plate weighing from 10½ to 12 ounces should be fired at a cone 9, and the thickness of the rim at that weight should be $\frac{7}{16}$ inch.

If the plate weighs from 12½ to 14 ounces the thickness of the rim should be $\frac{1}{8}$ inch. The relative weights and dimensions of the flat ware and the thickness of the rim are so related to the firing temperature, that the ware will retain its shape during bisque firing, and at the same time be translucent.

Among other things, by the use of the improved bodies as aforesaid, the relatively rapid drying of the ware after jigger forming is accomplished without cracking, the use of the highly absorptive Kentucky ball clay serving to permit sufficient water absorption in the body so that the ware dries uniformly without cracking during the relatively short drying period.

Forming hollow ware in the preferred improved china process

Hollow ware in the improved process is formed as heretofore described in the semi-porcelain process.

In the improved process, the hollow ware is taken out of the molds in a semi-green state, and is dried by being placed on stilliards either in the open or in a steam room.

The hollow ware as well as the flat ware is dried until the moisture content of the ware has been reduced to substantially 2%.

Bisque kiln operations in the preferred improved china process

The bisque kiln operations after the ware has been formed as aforesaid from the improved bodies, may be according to the steps heretofore described for the bisque kiln operations for the semi-porcelain process.

It has been found however that in a continuous kiln, bisque firing ware formed from the preferred body in Series "B", the firing time may be reduced to 37 hours at a cone of 9 to 10 down, and with the ware being subject to the maximum temperature in the bisque kiln for only 1½ hours as compared to 12 to 15 hours required in other china processes to attain translucency and vitrification.

The relatively coarse screening as set forth heretofore in the slip preparation in the improved process, provides a body which may be described as having relatively large flakes or grains overlapping and adhering to each other in the green state and being to a certain degree joined with each other in the dried state, and during the bisque kiln firing the overlapping flakes or grains fuse or tend to fuse or weld with each other.

In the improved china process, the bisque placing of the ware is exactly the same as the bisque placing of the ware in the semi-porcelain process, as aforesaid, in which the bungs of flat and cupped ware are placed directly in saggers without any silica sand, flint, or any other material or separating elements introduced between the pieces of the ware, and in which hollow ware is also placed in saggers without the use of any positioning materials or elements.

This method of bisque placing the ware as aforesaid is very rapid permitting minimum placing costs, and is very economical of space permitting maximum utilization of kiln space per firing with a consequent minimum cost for bisque kiln firing.

In no other china process has it been possible to place the ware for bisque firing without the use of supporting material or elements between the ware in the saggers, because all other china bodies have had an internal structure which was not strong enough to stand up in the bisque kiln firing without such supporting material or elements.

Gloss kiln operations in the preferred improved china process

The gloss kiln operations in the improved process may be according to the steps heretofore described for the semi-porcelain process, but it has been found that when a continuous kiln is used, the gloss kiln firing time may be reduced to 30 hours at a cone of .01 to 5 down, when the body is the preferred body in Series "B".

The semi-porcelain gloss kiln placing operation which is used in the improved process includes, as aforesaid, pin supporting the ware in the saggers; and in no other process for making light weight china has it been possible to pin support the ware in the saggers in the gloss kiln placing operation.

Finished burned ware

The finished burned ware of the present invention is vitreous, is translucent in the lighter weights, and is substantially less brittle than any other china with a consequent greater durability.

The use of H. P. 1 Canadian ball clay is preferred as aforesaid to make the improved bodies and products and to facilitate the carrying out of the improved processes or methods.

The Kentucky ball clays have characteristics similar to the preferred H. P. 1 Canadian ball clay and may be used to make the improved china bodies and products in the place of the H. P. 1 Canadian ball clay.

When the improved bodies and products are made with Kentucky ball clays, they are superior to usual china bodies and products, but are generally inferior to the preferred bodies and products made by the use of the H. P. 1 Canadian ball clay.

I claim:

1. In a method of making vitreous porcelain products, steps which include making a slip of ceramic materials for forming a ceramic body which vitrifies upon firing, passing the slip through a screen having a fineness substantially within the limits 120 to 150 mesh, forming green ware by subsequent processing of the screened slip, and bung placing the formed green ware for bisque kiln firing.

2. In a method of making vitreous porcelain products, steps which include making a slip of a ceramic mixture which vitrifies upon firing, passing the slip through a screen having a fineness substantially within the limits 120 to 150 mesh, making bats from the slip jigger forming ware from the bats, drying the formed ware bung placing the formed ware and bisque kiln firing the bung placed dried formed ware.

3. In a method of making vitreous porcelain products, steps which include making a slip of a ceramic mixture which vitrifies upon firing, passing the slip through a screen having a fineness substantially within the limits 120 to 150 mesh, making bats from the slip jigger forming ware from the bats, drying the formed ware, bung placing the formed ware and bisque kiln firing the bung placed dried formed ware, and then drawing, dipping and gloss kiln firing the bisque ware.

4. In a method of making vitreous porcelain products of material which vitrifies upon firing, steps which include making a slip of the material, passing the slip through a screen having a fineness substantially within the limits 120 to 150 mesh, forming hollow ware from the screened slip by slip molding, drying the formed ware, bung placing the formed ware and bisque kiln firing the bung placed dried formed ware.

5. In a method of making vitreous porcelain products of material which vitrifies upon firing, steps which include making a slip of the material, passing the slip through a screen having a fineness substantially within the limits 120 to 150 mesh, forming hollow ware from the screened slip by slip molding, drying the formed ware, bung placing the formed ware and bisque kiln firing the bung placed dried formed ware, and then drawing, dipping and gloss kiln firing the bisque ware.

6. In a method of making vitreous porcelain products the steps of forming green ware of a ceramic body which vitrifies upon firing and having a transverse strength in the green state of over 150 pounds per square inch, and bung placing the formed green ware for bisque kiln firing.

7. In a method of making vitreous porcelain products, steps which include making bats of a ceramic body which vitrifies upon firing and which includes a clay having substantially the characteristics of H. P. 1. Canadian ball clay, jigger forming ware from the bats, drying the formed ware, bung placing the formed ware and bisque kiln firing the bung placed dried formed ware.

8. In a method of making vitreous porcelain products, steps which include making bats of a ceramic body which vitrifies upon firing and which includes a clay having substantially the characteristics of H. P. 1. Canadian ball clay, jigger forming ware from the bats, drying the formed ware, bung placing the formed ware and bisque kiln firing the bung placed dried formed ware, and then drawing, dipping and gloss kiln firing the bisque ware.

9. In a method of making vitreous porcelain products of material which vitrifies upon firing and which includes a clay having substantially the characteristics of H. P. 1. Canadian ball clay, steps which include making a slip of the material, forming hollow ware from the slip by slip molding, drying the formed ware, bung placing the formed ware and bisque kiln firing the bung placed dried formed ware.

10. In a method of making vitreous porcelain products of material which vitrifies upon firing and which includes a clay having substantially the characteristics of H. P. 1. Canadian ball clay, steps which include making a slip of the material, forming hollow ware from the slip by slip molding, drying the formed ware, bung placing the formed ware and bisque kiln firing the bung placed dried formed ware, and then drawing, dipping and gloss kiln firing the bisque ware.

11. In a method of making vitreous porcelain products the steps of forming green ware of a ceramic body which vitrifies upon firing and which includes a clay having substantially the characteristics of H. P. 1. Canadian ball clay, and bung placing the formed green ware for bisque kiln firing.

12. In a method of making vitreous porcelain of products, steps consisting of treating a mixture of ceramic materials which vitrifies upon firing, by forming a slip and screening the slip to produce overlapping flakes, and forming green ware by subsequent processing of the slip having overlapping flakes.

13. In a method of making vitreous porcelain products, steps which include forming green ware from a ceramic body which vitrifies upon firing, drying the formed ware, bung placing the formed ware, and bisque kiln firing the bung placed dried formed ware for substantially 37 hours at a cone of 9 to 10 down.

JOHN I. BAHL.